United States Patent
Sun

(10) Patent No.: US 10,931,957 B2
(45) Date of Patent: Feb. 23, 2021

(54) IMAGE DECRYPTION APPARATUS AND METHOD OF THE SAME

(71) Applicant: Xiamen Sigmastar Technology Ltd., Xia'men (CN)

(72) Inventor: Ming-Yong Sun, Shanghai (CN)

(73) Assignee: XIAMEN SIGMASTAR TECHNOLOGY LTD., Xia'men (CN)

( * ) Notice: Subject to any disclaimer, the term of this patent is extended or adjusted under 35 U.S.C. 154(b) by 0 days.

(21) Appl. No.: 16/511,311

(22) Filed: Jul. 15, 2019

(65) Prior Publication Data

US 2020/0204811 A1 Jun. 25, 2020

(30) Foreign Application Priority Data

Dec. 25, 2018 (CN) .......................... 201811593362.0

(51) Int. Cl.
*H04N 9/80* (2006.01)
*H04N 5/76* (2006.01)
(Continued)

(52) U.S. Cl.
CPC ......... *H04N 19/426* (2014.11); *H04N 19/105* (2014.11); *H04N 19/139* (2014.11);
(Continued)

(58) Field of Classification Search
USPC ............... 386/259, 257, 255, 252, 239, 258
See application file for complete search history.

(56) References Cited

U.S. PATENT DOCUMENTS 5,883,674 A * 3/1999 Ogura ................... H04N 19/56
375/240.15
6,289,050 B1 * 9/2001 Ohtani ................... H04N 5/145
348/E5.066
(Continued)

FOREIGN PATENT DOCUMENTS

KR  20070097309 A  10/2007
KR  10 0874518 B1  12/2008
(Continued)

OTHER PUBLICATIONS

Taiwan Intellectual Property Office, Office Action letter of the counterpart TW application (appl. No. 108101590) dated Mar. 12, 2020. English summary on p. 1.
(Continued)

*Primary Examiner* — Daquan Zhao
(74) *Attorney, Agent, or Firm* — WPAT, PC

(57) ABSTRACT

The present disclosure discloses an image decryption method that includes steps outlined below. Control information in an image stream is read and decrypted. Image stream packets in the image stream are read according to the control information. According to the control information, pixel data of a first reference frame from a first temporary storage block of a memory module and/or of a second reference frame from a second temporary storage block of the memory module are selectively read. A decryption process is performed according to the image stream packets and selectively according to the pixel data of the first and/or the second reference frame to generate pixel data of a decrypted frame. During the decryption process, the pixel data of the decrypted frame is transmitted to a post-processing circuit and is stored to one of the first and the second temporary storage blocks according to the control information.

16 Claims, 4 Drawing Sheets

(51) Int. Cl.
  *H04N 5/92*    (2006.01)
  *H04N 19/426*  (2014.01)
  *H04N 19/70*   (2014.01)
  *H04N 19/139*  (2014.01)
  *H04N 19/105*  (2014.01)
  *H04N 19/172*  (2014.01)
  *H04N 19/182*  (2014.01)
  *H04N 5/94*    (2006.01)
  *H04N 5/00*    (2011.01)
  *G06K 9/00*    (2006.01)

(52) U.S. Cl.
  CPC ......... *H04N 19/172* (2014.11); *H04N 19/182* (2014.11); *H04N 19/70* (2014.11)

(56) References Cited

U.S. PATENT DOCUMENTS

| | | | |
|---|---|---|---|
| 6,452,971 B1* | 9/2002 | Iwasaki | H04N 19/40 348/699 |
| 8,553,767 B2 | 10/2013 | Koto et al. | |
| 9,232,233 B2 | 1/2016 | Zhou et al. | |
| 9,936,197 B2 | 4/2018 | Park et al. | |
| 2004/0044670 A1* | 3/2004 | Cazier | H04N 1/32144 |
| 2009/0252323 A1* | 10/2009 | Cooper | G06F 21/6218 380/54 |

FOREIGN PATENT DOCUMENTS

| | | |
|---|---|---|
| KR | 20180048732 A | 5/2018 |
| TW | 201309040 A1 | 2/2013 |
| TW | 201642657 A | 12/2016 |
| WO | WO2017041692 A1 | 3/2017 |

OTHER PUBLICATIONS

OA letter of the KR application (appl. No. 10-2019-0026888) mailed on Jul. 9, 2020.(Korea OA Translation is included).

* cited by examiner

IMAGE DECRYPTION APPARATUS AND METHOD OF THE SAME

BACKGROUND OF THE INVENTION

1. Field of the Invention

The present disclosure relates to image decryption, especially to an image decryption apparatus and an image decryption method.

2. Description of Related Art

Image codec can perform compression or decompression on digital videos such that the transmission of the videos can be more efficient. In most of the current encryption technologies, e.g. the encryption and decryption standard of H.264, H.265 or HEVC, the techniques of motion estimation and motion compensation are used to perform encryption process by using the frames within a specific time period as reference. The motion images can be efficiently recorded and compressed to save the data amount that is transmitted and stored. As a result, in the image decryption apparatus, a plurality of reference frames related to the timing sequence of the encryption process are required to be stored such that the frame under decryption can be processed according to the reference frames. Further, the part of the frame under decryption that is already decrypted has to be temporarily stored during the decryption process.

However, the reference frames and the decrypted frame are required to be stored in the memory. If there is no efficient storage mechanism, unnecessary waste of the memory usage may occur.

SUMMARY OF THE INVENTION

In consideration of the problem of the prior art, an object of the present disclosure is to provide an image decryption method and an image decryption apparatus to allow the reference frame required to perform decryption process and the generated decrypted frame share the temporary storage block in the memory module to effectively lower the usage of the memory.

The present disclosure discloses an image decryption method that includes steps outlined below. Control information in an image stream is read and decrypted. A plurality of image stream packets in the image stream are read according to the control information. According to at least the control information, corresponding pixel data of a first reference frame from a first temporary storage block of a memory module and/or reading corresponding pixel data of a second reference frame from a second temporary storage block of the memory module are selectively read by a decryption circuit. A decryption process is performed according to the image stream packets and selectively according to the corresponding pixel data of the first reference frame and/or the corresponding pixel data of the second reference frame to generate pixel data of a decrypted frame. During the decryption process, the pixel data of the decrypted frame is transmitted to a post-processing circuit and the pixel data of the decrypted frame is stored to one of the first temporary storage block and the second temporary storage block according to the control information.

The present disclosure also discloses an image decryption apparatus that includes a memory module, a decryption circuit, a post-processing circuit and a processing circuit electrically coupled to the memory module, the decryption circuit and the post-processing circuit. The processing circuit is configured to execute a plurality of software or firmware executable commands to operate an image decryption method. The image decryption method includes steps outlined below. Control information in an image stream is read and decrypted. A plurality of image stream packets in the image stream are read according to the control information. According to at least the control information, corresponding pixel data of a first reference frame from a first temporary storage block of a memory module and/or reading corresponding pixel data of a second reference frame from a second temporary storage block of the memory module are selectively read by a decryption circuit. A decryption process is performed according to the image stream packets and selectively according to the corresponding pixel data of the first reference frame and/or the corresponding pixel data of the second reference frame to generate pixel data of a decrypted frame. During the decryption process, the pixel data of the decrypted frame is transmitted to a post-processing circuit and the pixel data of the decrypted frame is stored to one of the first temporary storage block and the second temporary storage block according to the control information.

The present disclosure further discloses an image decryption method that includes steps outlined below. Control information is read and decrypted in an image stream. A plurality of image stream packets in the image stream is read according to the control information. According to at least the control information, corresponding pixel data of a first reference frame is read from a first temporary storage block of a memory module, wherein a stored content in the first temporary storage block is stored in an order, and the stored content comprises a former part and a latter part, wherein the former part is a maximum motion vector search range frame and the latter part is the first reference frame. A decryption process is performed according to the image stream packets and according to at least the corresponding pixel data of the first reference frame to generate pixel data of a decrypted frame. During the decryption process, the pixel data of the decrypted frame is transmitted to the post-processing circuit and the pixel data of the decrypted frame is stored to the first temporary storage block according to the control information to begin to replace the stored content from a part of the stored content having the most prior order.

The present disclosure further discloses an image decryption apparatus that includes a memory module, a decryption circuit, a post-processing circuit and a processing circuit electrically coupled to the memory module, the decryption circuit and the post-processing circuit. The processing circuit is configured to execute a plurality of software or firmware executable commands to operate an image decryption method. The image decryption method includes steps outlined below. Control information is read and decrypted in an image stream. A plurality of image stream packets in the image stream is read according to the control information. According to at least the control information, corresponding pixel data of a first reference frame is read from a first temporary storage block of a memory module, wherein a stored content in the first temporary storage block is stored in an order, and the stored content comprises a former part and a latter part, wherein the former part is a maximum motion vector search range frame and the latter part is the first reference frame. A decryption process is performed according to the image stream packets and according to at least the corresponding pixel data of the first reference frame to generate pixel data of a decrypted frame. During the decryption process, the pixel data of the decrypted frame is transmitted to the post-processing circuit and the pixel data of the decrypted frame is stored to the first temporary storage block according to the control information to begin to replace the stored content from a part of the stored content having the most prior order.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an image decryption apparatus and an image decryption method to efficiently economize the storage of the reference frame and the decrypted frame in the memory during the decryption process.

Figure 1:
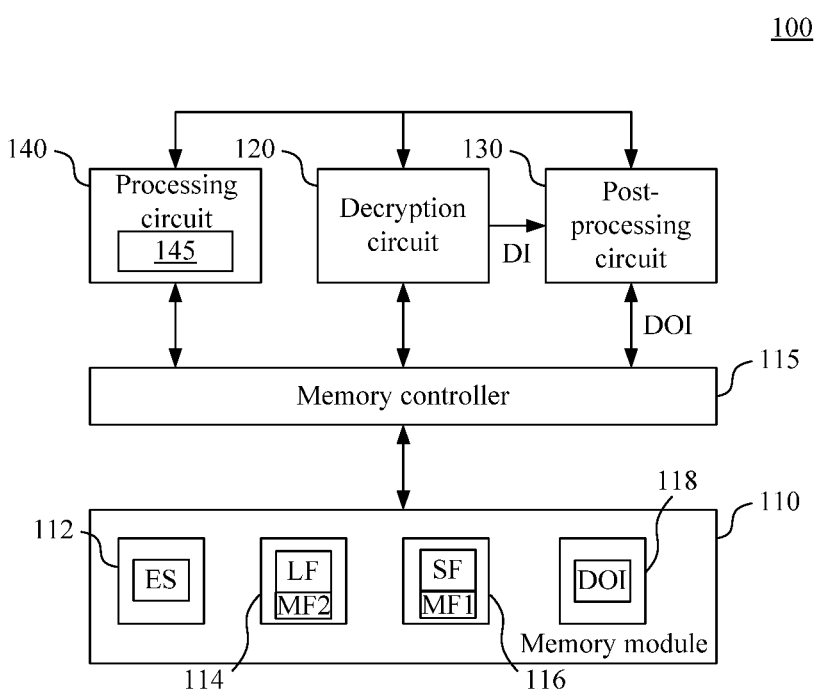
FIG. 1 is a block diagram of an image decryption apparatus in an embodiment of the present invention.

Reference is now made to FIG. 1. FIG. 1 is a block diagram of an image decryption apparatus 100 in an embodiment of the present invention. The image decryption apparatus 100 receives an image stream (element stream) ES and performs decryption process and post-processing according to image stream packets and control information of the image stream ES to generate output decrypted image DOI such that a display module (not illustrated) displays the output decrypted image DOI.

The image decryption apparatus 100 at least includes a memory controller 150, a memory module 110, a decryption circuit 120, a post-processing circuit 130 and a processing circuit 140. The memory module 110 can also be an independent element and can be coupled to the image decryption apparatus 100 through an interface.

In an embodiment, the memory module 110 is electrically coupled to the decryption circuit 120, the post-processing circuit 130 and the processing circuit 140 through the memory controller 150. The memory module 110 has different blocks to store different data that the image decryption process requires and at least includes blocks for storing image stream ES, one or more block for storing short-term reference frame, one or more block for storing long-term reference frame and a DOI block. The memory module 110 can be implemented by a memory having a faster speed, such as, but not limited to a double data rate synchronous dynamic random access memory (DDR SDRAM).

In an embodiment, the image decryption device further includes the memory controller 150 that is implemented by such as, but not limited to a memory interface unit (MUI). The other circuit modules in the memory decryption device 100, e.g. the decryption circuit 120, the post-processing circuit 130 and the processing circuit 140 can access the memory module 110 through the memory control 150 to store the data in the memory module 110 or read data from the memory module 110.

The decryption circuit 120 performs decryption process according to required data, such as, but not limited to reference frames and the image stream packets, gradually stores the pixels finished being decrypted to the memory module 110 and transmits the pixels finished being decrypted to the post-processing circuit 130 to generate a decrypted frame DI. The decryption circuit 120 can perform the decryption process according to such as, but not limited to H.264 or H.265 standard.

The post-processing circuit 130 performs post-processing, such as, but not limited to scaling, image quality processing or format conversion, on the decrypted frame DI to generate the output decrypted image DOI.

The processing circuit 140 is electrically coupled to the memory module 110, the decryption circuit 120 and the post-processing circuit 130. The processing circuit 140 can be configured to include one or more microprocessor or include image stream analysis circuit to execute software or firmware executable commands 141 to further perform the function of the image decryption apparatus 100. More specifically, the processing circuit 140 can retrieve the software or firmware executable commands 141 from a storage module (not illustrated) included in the image decryption apparatus 100, in which the software or firmware executable commands 141 includes such as, but not limited to commands for decrypting image stream control message, firmware or driver of the hardware modules including the post-processing circuit 130 and the decryption circuit 120 and related commands for operating and controlling the hardware modules including the post-processing circuit 130 and the decryption circuit 120. Accordingly, the processing circuit 140 further operates and controls the hardware modules including the post-processing circuit 130 and the decryption circuit 120 to accomplish the mechanism of performing decryption process and post-processing on the image stream ES to generate the output decrypted image DOI.

In an embodiment, the post-processing circuit 130, the decryption circuit 120 and the processing circuit 140 exchange required control message with each other during the image stream decryption process and the post-processing procedure.

Figure 2:
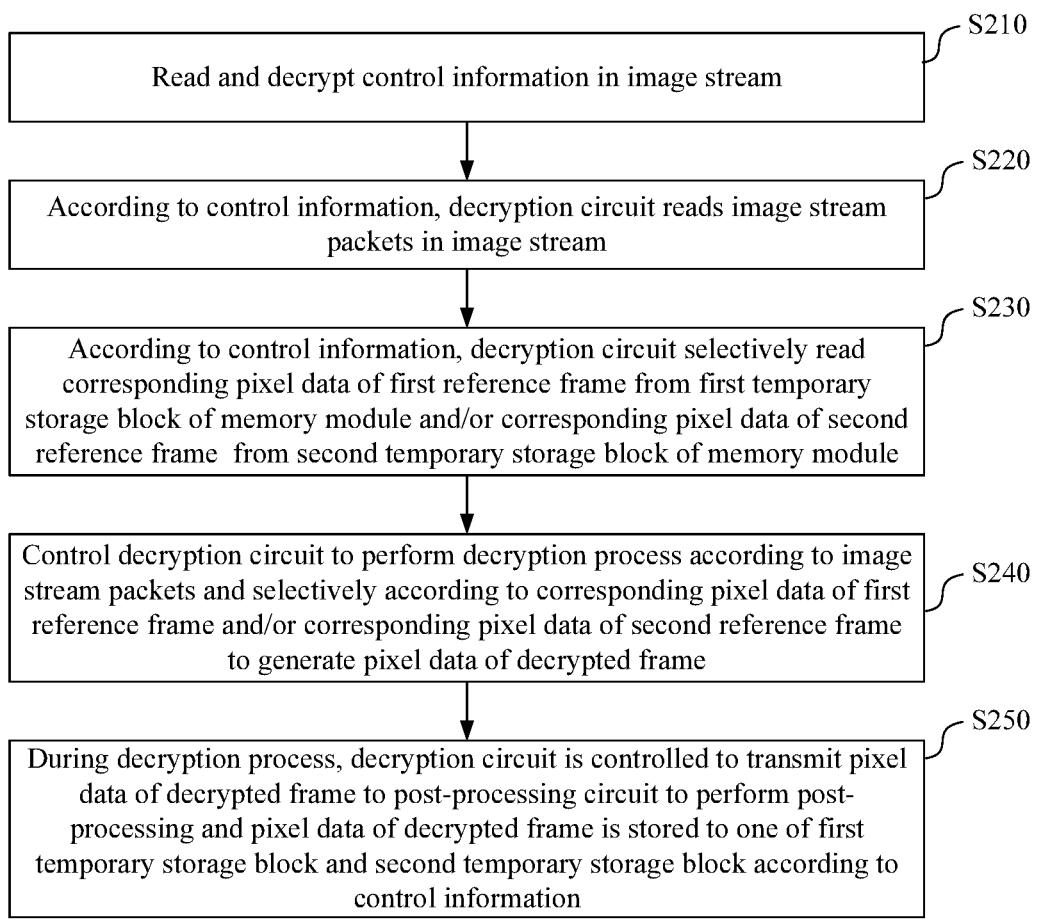
FIG. 2 is a flow chart of an image decryption method in an embodiment of the present invention.

Reference is now made to FIG. 2 at the same time. The detail of the function of the image decryption apparatus 100 is further described in the following paragraphs in accompany with FIG. 1 and FIG. 2.

FIG. 2 is a flow chart of an image decryption method 200 in an embodiment of the present invention. The image decryption method 200 can be used in the image decryption apparatus 100 illustrated in FIG. 1. As illustrated in FIG. 2, an embodiment of the image decryption method 200 includes the following steps.

Step S210: The processing circuit 140 reads and decrypts the control information in the image stream ES. The control information is used to identify whether the packets belong to a short-term reference frame (STRF) or a long-term reference frame (LTRF) and identify the parameters used for decryption.

In an embodiment, the image stream ES is stored temporarily in an image stream packet temporary storage block 112 of the memory module 110. The processing circuit 140 and the decryption circuit 120 can read the content in the image stream packet temporary storage block 112 through the memory controller 150 and obtain the control information and the image stream packets (ES packets) in the image stream ES.

Step S220: According to the control information, the decryption circuit 120 reads the image stream packets in the image stream ES.

In an embodiment, besides the control information, the image stream ES further includes the image stream packets. The control information in the image stream ES includes the information related to encryption, and the image stream packets include actual image data. According to the control information, the processing circuit 140 can learn the information of the packets that are going to be decrypted and the frames that are going to be used as reference and further control the decryption circuit 120 to read the image stream packets in the image stream ES through the memory controller 150.

Step S230: According to at least the control information, the decryption circuit 120 selectively read corresponding pixel data of a first reference frame SF from a first temporary storage block 114 of the memory module 110 and/or corresponding pixel data of a second reference frame LF from a second temporary storage block 116 of the memory module 110.

In an embodiment, the decryption circuit 120 can also selectively perform the read operation described above simultaneously according to the control information and the content of the image stream packets.

In an embodiment, the stored content in the first temporary storage block 114 at least includes the first reference frame SF, in which the first reference frame SF is a short-term reference frame in the present embodiment. In an example, the current frame under decryption is the N-th frame. The first reference frame SF can be the N−1-th frame, i.e. the frame that is finished being decrypted and is one frame previous to the current frame. The stored content in the second temporary storage block 116 at least includes the second reference frame LF, in which the second reference frame LF is a long-term reference frame in the present embodiment. In an example, the current frame under decryption is the N-th frame. The second reference frame LF can be the N−5-th frame, which is not the frame that is one frame previous to the current frame. The decryption circuit 120 reads the corresponding reference data according to requirement of each of the current frame under decryption, in which in a condition both of the short-term reference frame and the long-term reference frame are read, in another condition only one of the short-term reference frame and the long-term reference frame is read and in yet another condition no reference frame is read.

More specifically, in order to save the usage of the memory, if the current frame under decryption is also used as the short-term reference frame (for the frame to be decrypted later), the current frame under decryption shares the first temporary storage block 114 with the previous decrypted frame. The current frame under decryption gradually replaces the previous decrypted frame. However, at least a block of the previous decrypted frame is required to be kept that is used to perform the decryption process on the current frame under decryption. In the present embodiment, the image frame included in the image stream ES has a height of H and a width of W such that the size of the image frame is H×W. When a number of rows of a maximum forward motion vector search range set in the encryption and decryption standard is V, the size of the frame of the maximum forward motion vector search range is V×W. As a result, the size of the first temporary storage block 114 is H×W+V×W. In an embodiment, the first temporary storage block 114 is a ring buffer. However, the present invention is not limited thereto. If the current frame under decryption is also used as the long-term reference frame, the current frame under decryption shares the second temporary storage block 116 with the previous decrypted frame. The operations under such a condition is the same as the operation under the condition that the short-term reference frame shares the first temporary storage block 114 with the previous decrypted frame. Accordingly, the detail is not described herein.

Step S240: The decryption circuit 120 is controlled to perform a decryption process according to the image stream packets and selectively according to the corresponding pixel data of the first reference frame SF and/or the corresponding pixel data of the second reference frame LF to generate pixel data of the decrypted frame DI.

In an embodiment, the decryption circuit 120 performs decryption on the image stream packets in the image stream ES in an order according to a video encryption and decryption standard, e.g. H.264 or H.265, stores the pixels finished being decrypted in the memory module 110 and transmits the pixels finished being decrypted to the post-processing circuit 130 until the whole current frame under decryption is finished being decrypted to generate the decrypted frame DI. When the decryption circuit 120 performs decryption process on the image stream packets, the pixel data of the first reference frame SF and/or the pixel data of the second reference frame LF is selectively used as reference according to the control information and the image stream packets.

Step S250: During the decryption process, the decryption circuit 120 is controlled to transmit the pixel data of the decrypted frame DI to the post-processing circuit 130 to perform post-processing and the pixel data of the decrypted frame DI is stored to one of the first temporary storage block 114 and the second temporary storage block 116 according to the control information. In an embodiment, when the decrypted frame DI is used as the short-term reference frame, the decrypted pixels in the decrypted frame DI are stored in the first temporary storage block 114 in a sequential order. When the decrypted frame DI is used as the long-term reference frame, the decrypted pixels in the decrypted frame DI are stored in the second temporary storage block 116 in a sequential order.

In another embodiment, the storage of the reference frame is not limited to a short-term reference frame and a long-term reference frame. Further, the storage of the reference frame is not limited to the storage of the short-term reference frame in the first temporary storage block 114 and the storage of the long-term reference frame in the second temporary storage block 116. The system can modify the frame to be stored and the location that the frame is stored according to practical requirements.

Moreover, in an embodiment, the output decrypted image DOI generated after the post-processing performed by the post-processing circuit 130 can be displayed by the external display module.

In an embodiment, when the decrypted frame is the short-term reference frame, the decryption circuit 120 simultaneously reads the pixel data of the first reference frame SF in the first temporary storage block 114 through the memory controller 150 and stores the pixel data of the generated decrypted frame DI in the first temporary storage block 114 through the memory controller 150.

In an example, the first temporary storage block 114 is a ring buffer. When the first reference frame SF is required during the decryption process performed on the current frame under decryption, the size of the required maximum forward motion vector search range is V×W. The decryption circuit 120 begins to store the pixel data of the decrypted frame DI from a section having the size of V×W in the first temporary storage block 114 prior to a position of the first reference frame SF. The decrypted frame DI first replaces the content of the original maximum forward motion vector search range frame MF1. Subsequently, after the content of the maximum forward motion vector search range frame MF1 having the size of V×W is fully replaced, the decryption frame DI starts to replace a first section of the first reference frame SF until all the data in the decrypted frame DI is generated and stored.

By using the method described above that gradually replaces the content in the first temporary storage block 114 with the decrypted frame DI, the first reference frame SF and the decrypted frame DI can share the first temporary storage block 114. However, since the decryption circuit 120 requires the information of the section corresponding to the motion vector during the performance of decryption process, at least the section in the first reference frame SF that matches the maximum forward motion vector search range is required to be kept such that the final block of the decrypted frame DI can be decrypted by the decryption circuit 120 by referring to the first reference frame SF. The size of the maximum forward motion vector search range (i.e. the size of V) can be determined according to practical requirements.

When the decrypted frame is used as the long-term reference frame, the decryption circuit 120 simultaneously reads the pixel data of the second reference frame LF in the second temporary storage block 116 through the memory controller 150 and stores the pixel data of the generated decrypted frame DI in the second temporary storage block 116 through the memory controller 150. The operation performed on the second temporary storage block 116 is identical to the operation performed on the first temporary storage block 114. The detail of the operation is therefore not described herein.

Figure 3A:
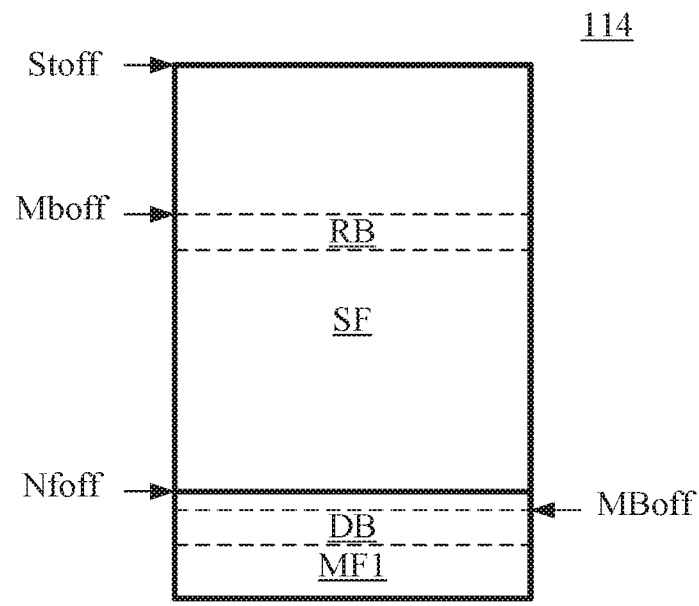
FIG. 3A to FIG. 3C are respectively a diagram of the first temporary storage block in an embodiment of the present invention.
Figure 3B:
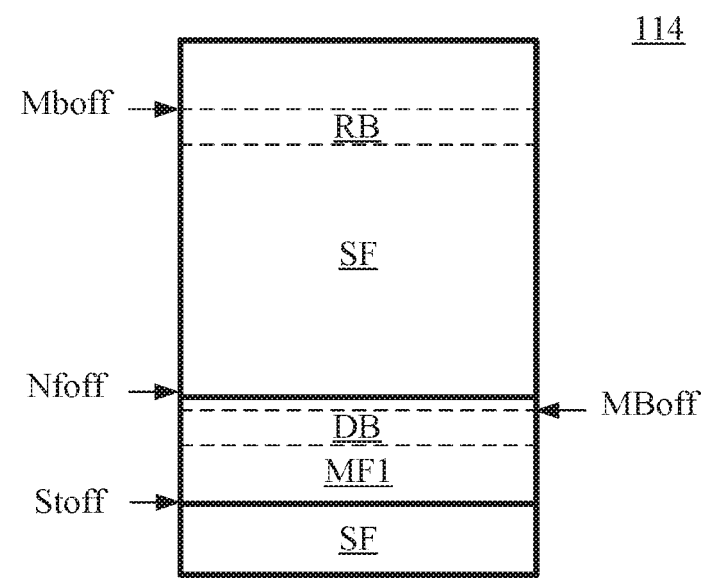
Figure 3C:
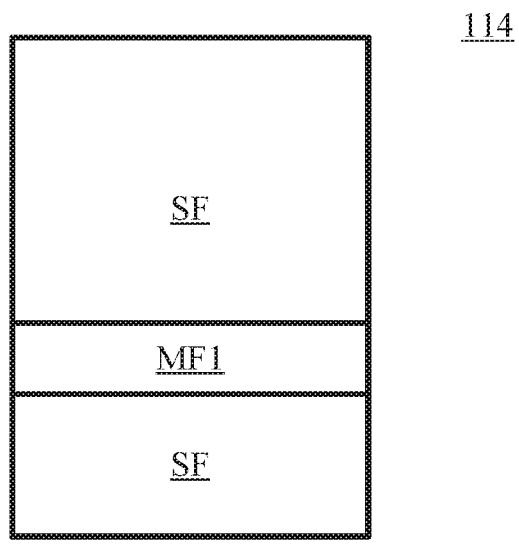

Reference is now made to FIG. 3A to FIG. 3C. FIG. 3A to FIG. 3C are respectively a diagram of the first temporary storage block 114 in an embodiment of the present invention.

As illustrated in FIG. 3A, the first temporary storage block 114 stores the first reference frame SF and the maximum forward motion vector search range frame MF1. When the decryption process is initialized, the decryption circuit 120 starts to read the first reference frame SF from an initial position thereof and starts to store the decrypted frame DI from an initial position of the maximum forward motion vector search range frame MF1.

In an embodiment, the read operation performed on the first reference frame SF is performed according to the following method. At first, an address offset of the initial position of the first reference frame SF relative to the initial position of the first temporary storage block 114 can be recorded as a reference frame initial address offset Stoff. Further, a frame block initial address offset Mboff of a reference frame block BR corresponding to the first reference frame SF can be retrieved by the processing circuit 140 according to the control information.

The processing circuit 140 further adds the frame block initial address offset Mboff and the reference frame initial address offset Stoff and divides an added result by the size (H×W+V×W) of the first temporary storage block 114 to obtain a remainder R1. More specifically, the remainder R1=(Mboff+Stoff) mod (H×W+V×W). In an embodiment, since the storage of the first reference frame SF is continuous, the added result of the frame block initial address offset Mboff and the reference frame initial address offset Stoff does not exceed the size of the first temporary storage block 114. The remainder R1 is equivalent to the added result.

Subsequently, the processing circuit 140 calculates a read initial address (IA+R1) by adding a temporary block initial address IA of the first temporary storage block 114 in the memory module 110 and the remainder R1. The decryption circuit 120 starts to read the required reference frame block RB from the read initial address.

On the other hand, the storage of the decrypted frame DI can be performed by using the following method. At first, an address offset of the initial position of the N-th decrypted frame DI relative to the initial position of the first temporary storage block 114 can be recorded as a decrypted frame initial address offset Nfoff. Further, a decrypted frame block initial address offset MBoff of a decrypted frame block included in the decrypted frame DI relative to the initial position of the decrypted frame DI can be determined by the processing circuit 140.

The processing circuit 140 further adds the decrypted frame block initial address offset MBoff and the decrypted frame initial address offset Nfoff and divides an added result by the size of the first temporary storage block 114 to obtain a remainder R2. More specifically, the remainder R2= (MBoff+Nfoff) mod (H×W+V×W).

In the present embodiment, when the part of the decrypted frame DI already stored does not exceed the size of the maximum forward motion vector search range frame MF1, the added result of the decrypted frame block initial address offset MBoff and the decrypted frame initial address offset Nfoff does not exceed the size of the first temporary storage block 114. The remainder R2 is equivalent to the added result.

Subsequently, the processing circuit 140 calculates a storage initial address (IA+R2) by adding the temporary block initial address IA of the first temporary storage block 114 in the memory module 110 and the remainder R2. The decryption circuit 120 starts to store the decrypted frame block DB from the storage initial address.

When the part of the decrypted frame DI already stored exceeds the size of the maximum forward motion vector search range frame MF1, the added result of the decrypted frame block initial address offset MBoff and the decrypted frame initial address offset Nfoff exceeds the size of the first temporary storage block 114. When the added result is divided by the size (H×W+V×W) of the first temporary storage block 114, the quotient is larger than 1. As a result, by obtaining the remainder R2, the processing circuit 140 calculates the actual storage initial address (IA+R2) by adding the temporary block initial address IA of the first temporary storage block 114 in the memory module 110 and the remainder R2. The decryption circuit 120 starts to store the decrypted frame block from such storage initial address.

More specifically, when the part of the decrypted frame DI already stored exceeds the size of the maximum forward motion vector search range frame MF1, the processing circuit 140 further performs storage operation from the top of the first temporary storage block 114 to replace the original first reference frame SF.

As a result, after performing decryption process by using the method described above, as illustrated in FIG. 3B, the stored N-th decrypted frame DI acts as the new first reference frame SF, in which the storage of the new first reference frame SF in the first temporary storage block 114 is divided into two parts. The first part corresponds to a former decryption time and is equivalent to the maximum forward motion vector search range frame MF1. The second part corresponds to latter decryption time. However, the address of the second part in the first temporary storage block 114 starts from the initial address of the first temporary storage block 114 and is thus prior to the address of the first part in the first temporary storage block 114. Further, the second part is equivalent to a part of the first reference frame SF in FIG. 3A. The other part of the first reference frame SF in FIG. 3A becomes the new maximum forward motion vector search range frame MF1.

When the decryption process corresponding to the N+1-th decrypted frame DI is performed, the procedure described above is repeated. More specifically, the decryption circuit 120 performs the calculation of the address by using the method described above and starts to perform read operation according to the initial address of the first reference frame SF in FIG. 3B. After the decryption process, another calculation of the address is further performed to start to store the decrypted frame DI from the initial address of the maximum forward motion vector search range frame MF1 in FIG. 3B.

As a result, by using the method described above to perform decryption process, as illustrated in FIG. 3C, the stored N+1-th decrypted frame DI acts as the new first reference frame SF. The remained part of the original first reference frame SF becomes the new maximum forward motion vector search range frame MF1.

As a result, the image decryption apparatus 100 allows the first reference frame SF and the decrypted frame DI to share the same temporary storage block by using the circular storage mechanism in a sequential order. In an actual implementation, the circular storage mechanism of the first temporary storage block 114 can be realized by a circular buffer or by disposing a memory management unit.

Furthermore, during the generation of the decrypted frame DI, the decryption circuit 120 simultaneously transmits the decrypted frame DI to the post-processing circuit 130 to perform post-processing thereon. The decrypted frame DI is not required to be stored in an additional storage and can be accessed by the post-processing circuit 130 directly. As a result, the mechanism of the present invention described above can save the bandwidth of the accessing activity of the memory.

In an embodiment, the decryption circuit 120 can also compress the generated decrypted frame DI first and store the compressed decrypted frame DI to the first temporary storage block 114. As a result, the size of the first temporary storage block 114 can be further decreased to save more usage of the memory.

It is appreciated that in the embodiments described above, the condition that the first temporary storage block 114 is configured to store the short-term reference frame (the first reference frame SF) is used as an example. However, in another embodiment, the second temporary storage block 116 configured to store the long-term reference frame (the second reference frame LF) can also be implemented to have the circular buffer mechanism described above such that the second reference frame LF used as the long-term reference frame and the decrypted frame DI can share the same temporary storage block.

More specifically, after reading the control information, the processing circuit 140 determines whether the decrypted frame DI that is decrypted in the moment should be stored in the first temporary storage block 114 corresponding to the short-term reference frame or in the second temporary storage block 116 corresponding to the long-term reference frame. After the target of the storage is determined, the processing circuit 140 replaces the content in the target of the storage by using the mechanism described above. As a result, the operation mechanism of the second temporary storage block 116 is not further described herein.

Moreover, in the embodiments described above, the condition that the first temporary storage block 114 is configured to store one short-term reference frame is used as an example. In other embodiments, the first temporary storage block 114 may be configured to store a plurality of short-term reference frames such that the decryption circuit 120 performs decryption process according to the plurality of short-term reference frames.

In addition, in the embodiments described above, the condition that both of the short-term reference frame and the long-term reference frame are used as reference to perform decryption process is used as an example. In other embodiments, the decryption circuit 120 can perform decryption process according to only the short-term reference frame.

It is appreciated that the embodiments described above are merely an example. In other embodiments, it should be appreciated that many modifications and changes may be made by those of ordinary skill in the art without departing from the spirit of the invention.

In summary, the image decryption apparatus and the image decryption method of the present invention allow the reference frame required to perform decryption process and the generated decrypted frame share the temporary storage block in the memory module to effectively lower the usage of the memory.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An image decryption method, comprising:
reading and decrypting control information in an image stream;
reading a plurality of image stream packets in the image stream according to the control information;
according to at least the control information, selectively reading corresponding pixel data of a first reference frame from a first temporary storage block of a memory module and/or reading corresponding pixel data of a second reference frame from a second temporary storage block of the memory module by a decryption circuit;
performing a decryption process according to the image stream packets and selectively according to the corresponding pixel data of the first reference frame and/or the corresponding pixel data of the second reference frame to generate pixel data of a decrypted frame; and
during the decryption process, transmitting the pixel data of the decrypted frame to a post-processing circuit and storing the pixel data of the decrypted frame to one of the first temporary storage block and the second temporary storage block according to the control information, wherein when the decrypted frame is a short-term reference frame, the pixel data of the decrypted frame is stored to the first temporary storage block, and the pixel data of the decrypted frame is began to be stored from a section in the first temporary storage block prior to a position of the first reference frame when a size of the section is equivalent to a maximum forward motion vector search range.

2. The image decryption method of claim 1, wherein the step of storing the pixel data of the decrypted frame to one of the first temporary storage block and the second temporary storage block according to the control information further comprising:
compressing the pixel data of the decrypted frame.

3. The image decryption method of claim 1, wherein the first temporary storage block and the second temporary storage block are located in a same dynamic random access memory.

4. An image decryption apparatus comprising:
a memory module;
a decryption circuit;
a post-processing circuit; and
a processing circuit electrically coupled to the memory module, the decryption circuit and the post-processing circuit and configured to execute a plurality of software or firmware executable commands to operate an image decryption method, wherein the image decryption method comprises:
reading and decrypting control information in an image stream;
reading a plurality of image stream packets in the image stream according to the control information;
according to at least the control information, selectively reading corresponding pixel data of a first reference frame from a first temporary storage block of the memory module and/or reading corresponding pixel data of a second reference frame from a second temporary storage block of the memory module by the decryption circuit;
performing a decryption process according to the image stream packets and selectively according to the corresponding pixel data of the first reference frame and/or the corresponding pixel data of the second reference frame to generate pixel data of a decrypted frame; and
during the decryption process, transmitting the pixel data of the decrypted frame to the post-processing circuit and storing the pixel data of the decrypted frame to one of the first temporary storage block and the second temporary storage block according to the control information, wherein when the decrypted frame is a short-term reference frame, the pixel data of the decrypted frame is stored to the first temporary storage block, and the pixel data of the decrypted frame is began to be stored from a section in the first temporary storage block prior to a position of the first reference frame when a size of the section is equivalent to a maximum forward motion vector search range.

5. The image decryption apparatus of claim 4, wherein the step of storing the pixel data of the decrypted frame to one of the first temporary storage block and the second temporary storage block according to the control information further comprising:
compressing the pixel data of the decrypted frame.

6. The image decryption apparatus of claim 4, wherein the first temporary storage block and the second temporary storage block are located in a same dynamic random access memory.

7. An image decryption method, comprising:
reading and decrypting control information in an image stream;
reading a plurality of image stream packets in the image stream according to the control information;
according to at least the control information, reading corresponding pixel data of a first reference frame from a first temporary storage block of a memory module, wherein a stored content in the first temporary storage block is stored in an order, and the stored content comprises a former part and a latter part, wherein the former part is a maximum motion vector search range frame and the latter part is the first reference frame;
performing a decryption process according to the image stream packets and according to at least the corresponding pixel data of the first reference frame to generate pixel data of a decrypted frame; and
during the decryption process, transmitting the pixel data of the decrypted frame to the post-processing circuit and storing the pixel data of the decrypted frame to the first temporary storage block according to the control information to begin to replace the stored content from a part of the stored content having the most prior order.

8. The image decryption method of claim 7, wherein the pixel data of the decrypted frame sequentially replaces the maximum motion vector search range frame and a first part of the first reference frame to become the new first reference frame, and a second part of the original first reference frame latter to the first part becomes the new maximum motion vector search range frame.

9. The image decryption method of claim 7, wherein the step of reading the first reference frame further comprises:
retrieving a frame block initial address offset of a reference frame block corresponding to the first reference frame according to the control information;
adding the frame block initial address offset and a reference frame initial address offset of the first reference frame and dividing an added result by a size of the first temporary storage block to obtain a remainder; and
starting to read the reference frame block from a read initial address that is obtained by adding a temporary block initial address of the first temporary storage block in the memory module and the remainder.

10. The image decryption method of claim 7, wherein the step of storing the pixel data of the decrypted frame to the first temporary storage block further comprises:
determining a decrypted frame block initial address offset of a decrypted frame block corresponding to the decrypted frame;
adding the decrypted frame block initial address offset and a decrypted frame initial address offset of the decrypted frame and dividing an added result by a size of the first temporary storage block to obtain a remainder; and
storing the decrypted frame block from a storage initial address obtained by adding a temporary block initial address of the first temporary storage block in the memory module and the remainder.

11. The image decryption method of claim 7, further comprising:
reading at least a second reference frame line by line from a second temporary storage block of the memory module according to the control information; and
performing the decryption process according to the image stream packets and according to the first reference frame and the second reference frame to generate the decrypted frame.

12. The image decryption method of claim 11, wherein the first reference frame is one of a short-term reference frame and a long-term reference frame and the second reference frame is one of the other of the short-term reference frame and the long-term reference frame.

13. The image decryption method of claim 7, wherein a size of the maximum motion vector search range frame is a product of a frame width and a maximum number of search lines.

14. The image decryption method of claim 7, further comprising:

storing the pixel data of the decrypted frame after post-processing in a display temporary storage block of the memory module.

15. The image decryption method of claim 7, further comprising:
compressing the pixel data of the decrypted frame and storing the pixel data of the compressed decrypted frame to the first temporary storage block.

16. An image decryption apparatus comprising:
a memory module;
a decryption circuit;
a post-processing circuit; and
a processing circuit electrically coupled to the memory module, the decryption circuit and the post-processing circuit and configured to execute a plurality of software or firmware executable commands to operate an image decryption method, wherein the image decryption method comprises:
reading and decrypting control information in an image stream;
reading a plurality of image stream packets in the image stream according to the control information by the decryption circuit;
according to at least the control information, reading corresponding pixel data of a first reference frame from a first temporary storage block of a memory module, wherein a stored content in the first temporary storage block is stored in an order, and the stored content comprises a former part and a latter part, wherein the former part is a maximum motion vector search range frame and the latter part is the first reference frame;
performing a decryption process according to the image stream packets and according to at least the corresponding pixel data of the first reference frame to generate pixel data of a decrypted frame; and
during the decryption process, transmitting the pixel data of the decrypted frame to the post-processing circuit and storing the pixel data of the decrypted frame to the first temporary storage block according to the control information to begin to replace the stored content from a part of the stored content having the most prior order.

* * * * *